US006696196B1

(12) United States Patent
Eilers

(10) Patent No.: US 6,696,196 B1
(45) Date of Patent: Feb. 24, 2004

(54) CLOSED BATTERY CONTAINER HAVING HIGH VOLUME RAPID VENTING FEATURE

(75) Inventor: Derek Eilers, Fort Wayne, IN (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 341 days.

(21) Appl. No.: 09/377,015

(22) Filed: Aug. 18, 1999

(51) Int. Cl.$^7$ .............................................. H01M 2/12
(52) U.S. Cl. ........................ 429/56; 429/163; 429/175
(58) Field of Search ......................... 429/56, 163, 175

(56) References Cited

U.S. PATENT DOCUMENTS

| | | |
|---|---|---|
| 2,525,436 A | 10/1950 | Williams, Jr. |
| 3,195,769 A | 7/1965 | Miller |
| 4,245,010 A | 1/1981 | Golz |
| 4,256,812 A | 3/1981 | Tamura et al. |
| 4,484,691 A | * 11/1984 | Lees |
| 4,576,303 A | 3/1986 | Mundt et al. |
| 4,601,959 A | 7/1986 | Romero |
| 4,662,126 A | 5/1987 | Malcolm |
| 4,842,965 A | * 6/1989 | Urushiwara et al. .......... 429/56 |
| 5,002,085 A | 3/1991 | FitzGerald |
| 5,413,237 A | 5/1995 | Farwell |
| 6,159,631 A | * 12/2000 | Thompson et al. ............ 429/82 |
| 6,180,279 B1 | * 1/2001 | Kinuta .......................... 429/56 |
| 6,210,825 B1 | * 4/2001 | Takada et al. ................. 429/56 |

OTHER PUBLICATIONS

Vent–Safexplosion Vents/Panels, BS&B Safety Systems Internet Website Page, www.bsbsystems.com/exvent.htm, May 19, 1998.
"Type VSP and VSS Explosion Vents", BS&S Safety Systems Internet Website Page, www,bsbststems.com/exvent.htm,May 19, 1998.
"Type VSE Explosion Vents", BS&B Safety Systems Internet Website Page, www.bsbsystems.com/exvent.htm,May 19, 1998.
"Type EXP/DV Explosion Vents", BS&B Safety Systems Internet Website Page, www.bsbsystems.com/exvent.htm, May 19, 1998.
"Type LCV Explosion Vents", BS&B Safety Systems Internet Website Page, www.bs&bsystems.com/exvent.htm,May 19,1998.
"Type EXP and EXP/V Explosion Vents", BS&B Safety Systems Internet Website Page, www.bsbsystems.com/exvent.htm,May 19, 1998.
"An Introduction to Purture Disk Technology", BS&B Safety Systems Catalog 77–1001, Section A, need date.
"FRB Frustum Reverse Buckling Rupture Disk", BS&B Safey Systems Catalog 77–4008, Section D–4, need date.

* cited by examiner

Primary Examiner—Patrick Ryan
Assistant Examiner—Tracy Dove
(74) Attorney, Agent, or Firm—Baker & Daniels

(57) ABSTRACT

A closed battery container having walls defining an interior which is subjected to one of a first and a second pressure, the first pressure much lower than the second pressure. The closed container includes a highly rigid panel at least partially forming one of the container walls, the panel having an interior surface exposed to the interior of the container, and an opposite, exterior surface. One of the interior and exterior panel surfaces is provided with a groove having substantially parallel first and second groove segments, the first and second groove segments laterally spaced, and a third groove segment extending between the first and second groove segments. The panel has a first portion which lies on one side of the third groove segment, and a second portion which lies on the opposite side of the third groove segment, the first and second panel portions integrally connected across the third groove segment at the first container interior pressure, whereby the panel is in an unruptured state. The first and second panel portions are integrally disconnected across the third groove segment in response to the container interior being at the second container interior pressure, whereby the panel is in a ruptured state.

29 Claims, 5 Drawing Sheets

FIG_1

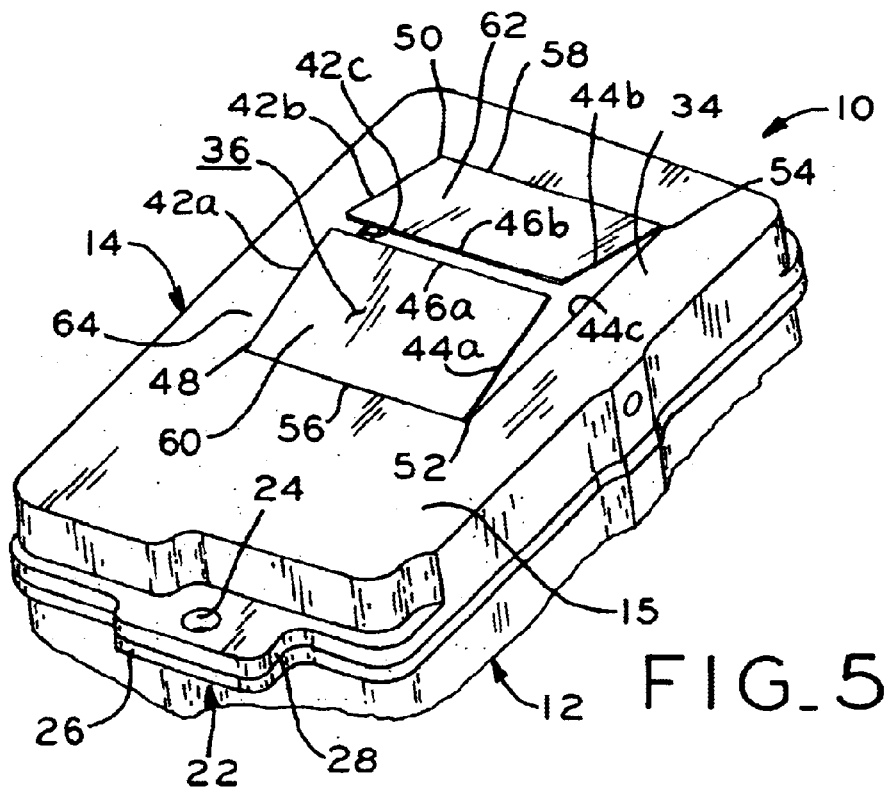
FIG_5
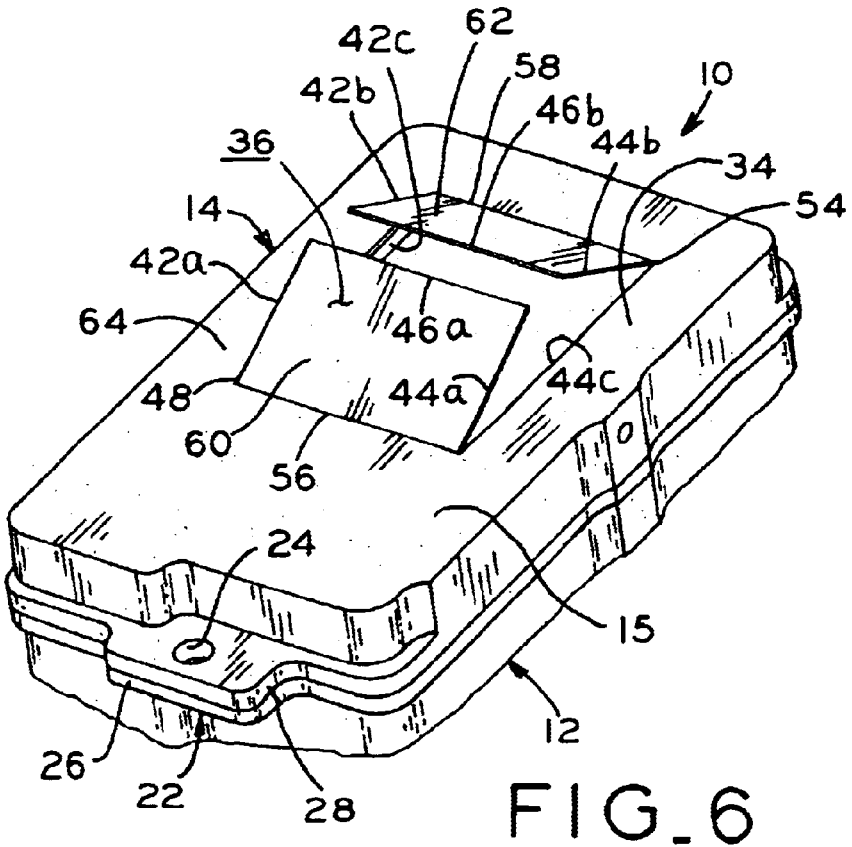
FIG_6

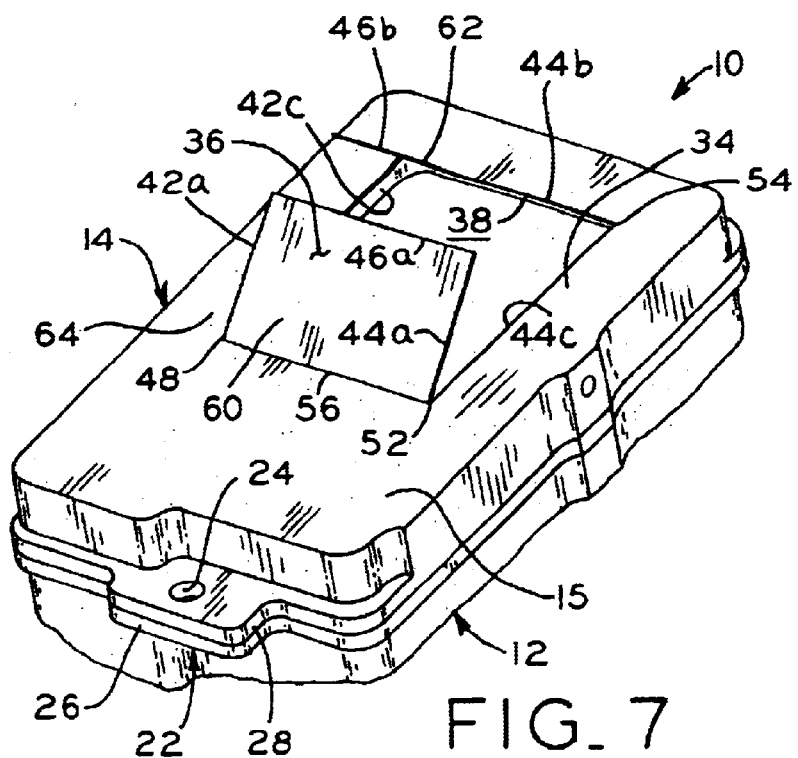
FIG_7
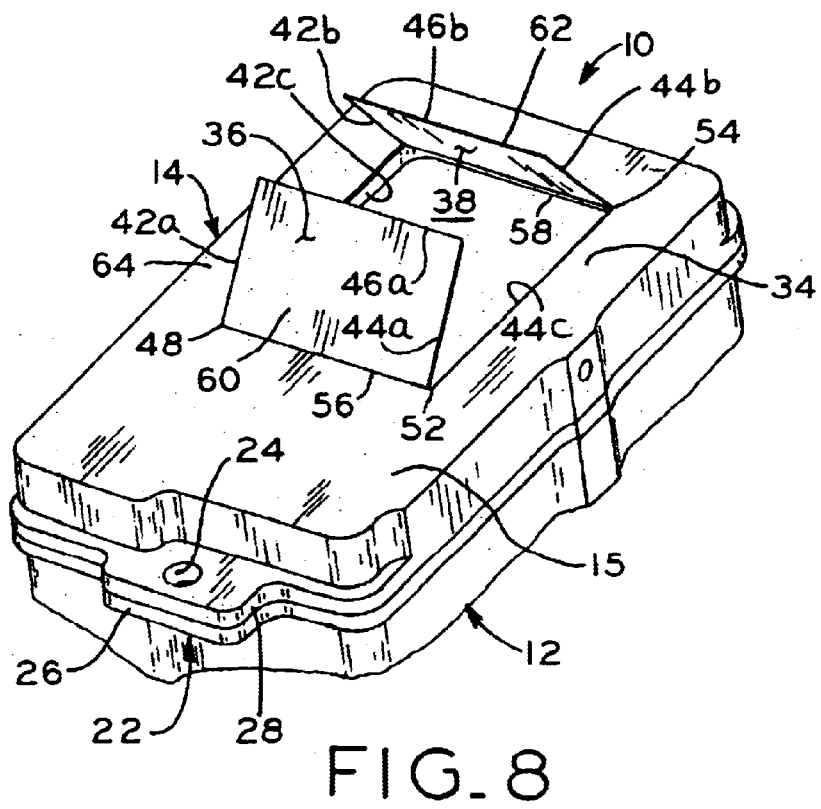
FIG_8

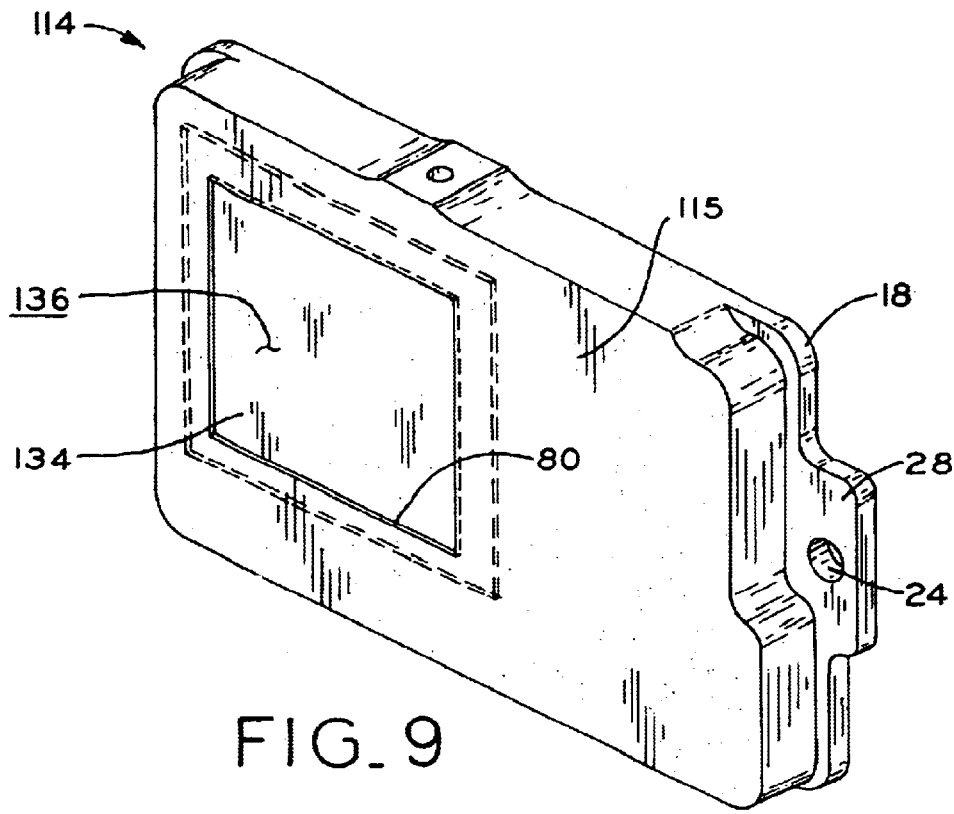
FIG_9
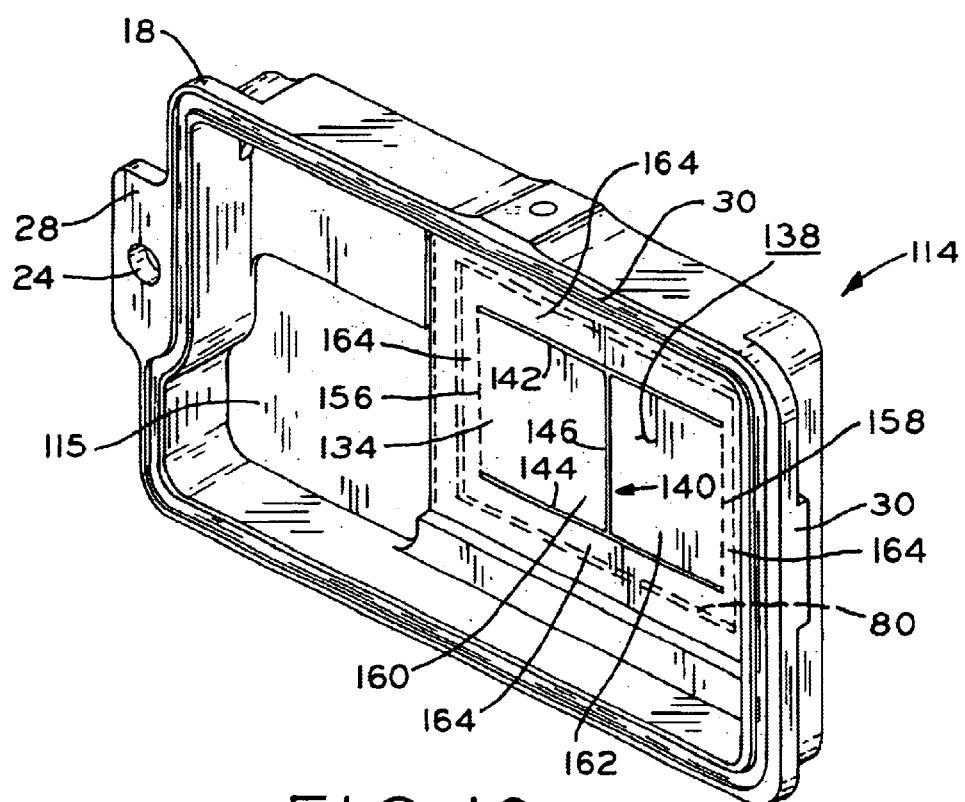
FIG_10

CLOSED BATTERY CONTAINER HAVING HIGH VOLUME RAPID VENTING FEATURE

BACKGROUND OF THE INVENTION

This invention relates to a closed container having a rupturable portion which allows fluid pressure buildup to be vented therefrom, and in particular to a battery container.

Rupture panels and disks have long been used as a means for enclosing and venting closed containers. Such panels and disks are constructed to burst or rupture when the pressure of a fluid within the container exceeds a predetermined level, and may define a portion of the exterior surface of the container. Previous rupture panels, however, are typically made of a thin, easily deflectable, foil-like material, and are not very rigid. Such previous rupture panels perform unsatisfactorily in certain applications which require protection of the item within the container from being crushed or otherwise damaged. One application in which high rigidity of the entire exterior container surface is desired is a battery pack for powering portable electronic equipment in the field. Such equipment, for example, a radio, and its power source may be carried on the person and is subjected to various hazards which may result in damage to the batteries were they not adequately protected. Protection of the batteries, which may be provided by a container having a highly rigid exterior surface, is not the only criterion for such applications, however.

The batteries may be of a type which comprise materials such as Lithium-Sulfur Dioxide ($Li-SO_2$), which may violently explode and create a sudden and high increase in pressure within the container. A D-cell sized $Li-SO_2$ battery of the type which may be disposed within a closed battery container is estimated to release as much as 40 cubic feet of gas in less than 0.2 seconds when it explodes; a pressure rise within the container as a result of such an explosion is thus very sharp and substantial. A means of rapidly venting the closed container in which such batteries are disposed is therefore necessary, else, the container, particularly if highly rigid, may shatter as a result of the explosion, and produce high velocity, loose fragments which may cause injury to the person carrying the container, or those nearby. If the venting means itself comprises a portion of the container itself, and is to provide a highly rigid exterior surface, its rupturing may itself produce undesirable high velocity, loose fragments. A means of providing a highly rigid closed container having a means for venting which does not produce loose fragments is highly desirable.

SUMMARY OF THE INVENTION

The present invention solves the problems exhibited by the prior art applications by providing a container having a highly rigid exterior and means for venting fluids therein which does not produce loose fragments. One embodiment of the inventive container comprises a highly rigid flat panel which provides an exterior container surface and which has a substantially H- or I-shaped groove formed therein. Analogizing the shape of this groove to the cross-section of an ordinary I-beam having a center web interconnecting opposed flanges, the panel, in response to a sufficient rise in pressure within the container, ruptures first along the "web" of the groove, separating thereacross, By and proceeds to tear along the groove "flanges" in opposite directions from the "web". The panel is plastically deformable, and includes portions between the flanges, on opposite sides of the web, which open outwardly as the panel ruptures, creating the effect of "double doors" which are hinged at the opposite ends of the groove flanges, where the panel material is plastically deformed, but still comprising a single piece. Thus, no loose fragments are formed during the venting of the closed container. The panel may be comprised of a material having a grain which is oriented in a direction parallel to the groove flanges; the grain thereby promoting the tearing of the panel material along the groove flanges. The opening provided by the double doors allows a high volume of gas to rapidly escape the container, and the panel ruptures without shattering, thereby eliminating the danger of injury resulting from the fragmentation of the container.

The present invention provides a closed battery container having walls defining an interior which is subjected to one of a first and a second pressure, the first pressure much lower than the second pressure. The closed container includes a highly rigid panel at least partially forming one of the container walls, the panel having an interior surface exposed to the interior of the container, and an opposite, exterior surface. One of the interior and exterior panel surfaces is provided with a groove having substantially parallel first and second groove segments, the first and second groove segments laterally spaced, and a third groove segment extending between and connected to the first and second groove segments. The panel has a first portion which lies on one side of the third groove segment, and a second portion which lies on the opposite side of the third groove segment, the first and second panel portions integrally connected across the third groove segment at the first container interior pressure, whereby the panel is in an unruptured state. The first and second panel portions are integrally disconnected across the third groove segment in response to the container interior being at the second container interior pressure, whereby the panel is in a ruptured state.

The present invention also provides a closed container having walls defining an interior which is subjected to one of a first and a second pressure, the first pressure much less than the second pressure. The closed container includes a highly rigid panel at least partially forming one of the container walls, the panel having an interior surface exposed to the interior of the container, and an opposite, exterior surface. The panel has an unruptured state at the first pressure, and the panel is urged into a ruptured state in response to an increase in interior pressure from the first pressure to the second pressure. The container also includes means for forming a pair of outwardly swinging doors in the panel as the panel is urged into its ruptured state, the doors open and attached to the panel in the ruptured state.

The present invention further provides a closed container having walls defining an interior which is subjected to one of a first and a second pressure, the first pressure much lower than the second pressure. The closed container includes a substantially rigid panel at least partially forming one, of the container walls, the panel having an interior surface exposed to the interior of the container, and an opposite, exterior surface. One of the interior and exterior panel surfaces is provided with a groove having first and second elongate groove segments which extend smoothly along their respective lengths, the first and second groove segments laterally spaced, and a third elongate groove segment extending between and connected to the first and second groove segments, the panel having a first portion which lies on one side of the third groove segment, and a second portion which lies on the opposite side of the third groove segment, the first and second panel portions integrally connected across the third groove segment, whereby the first and second panel portions become disconnected across the third groove segment in response to the container interior being at the second container interior pressure, whereby the panel is in a ruptured state.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIGS. 5–8 are successive fragmentary perspective views of the closed container of FIG. 1 during venting thereof;

FIG. 9 is an exterior perspective view of the cover of a second embodiment of a closed container according to the present invention; and FIG. 10 is an interior perspective view of the cover of FIG. 9.

Figure 1:
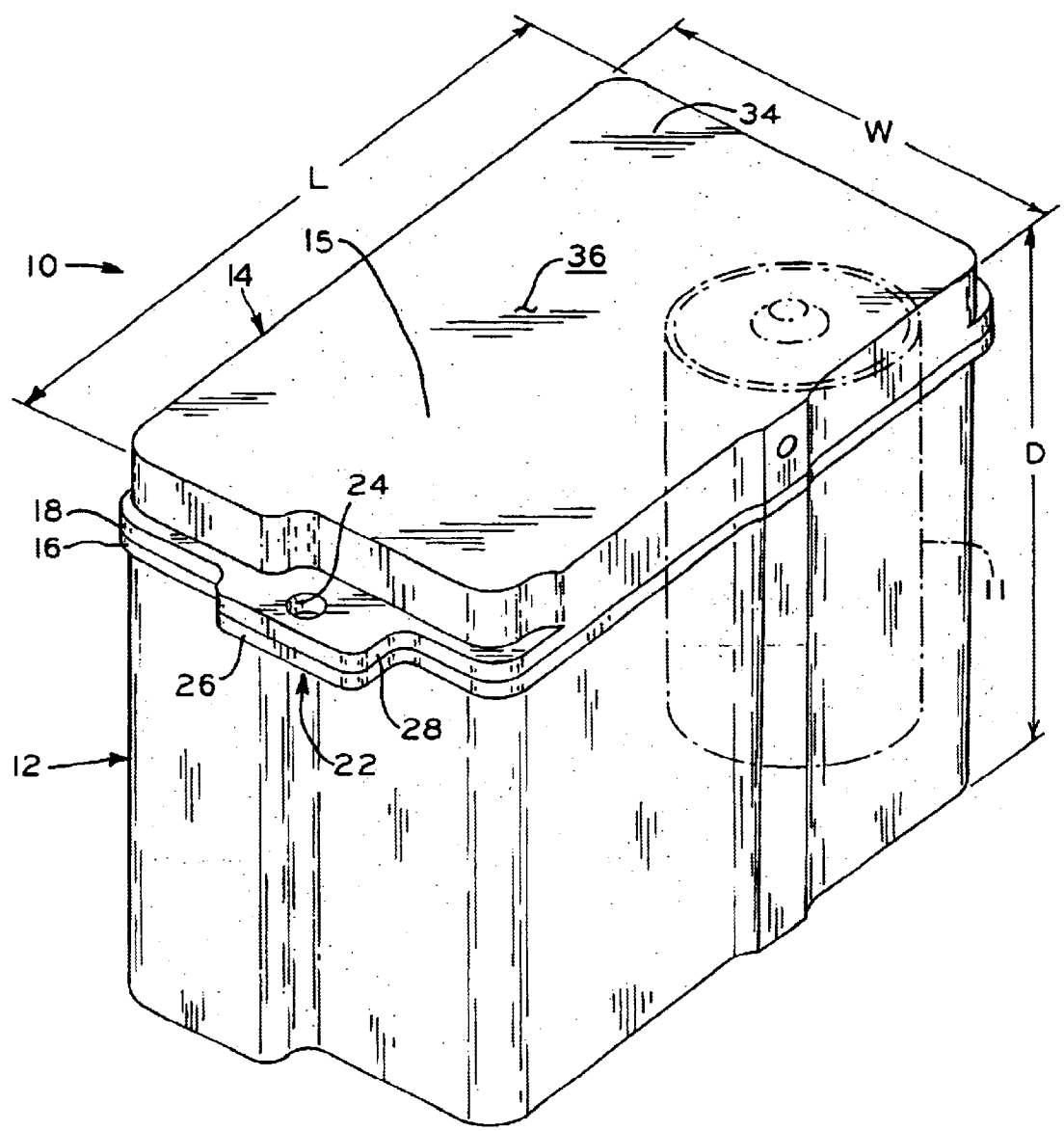
FIG. 1 is a perspective view of a first embodiment of a closed container according to the present invention, the container comprising a case and a cover.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, and such exemplifications are not to be construed as limiting the scope of the invention in any manner.

DETAILED DESCRIPTION OF THE INVENTION

Figure 2:
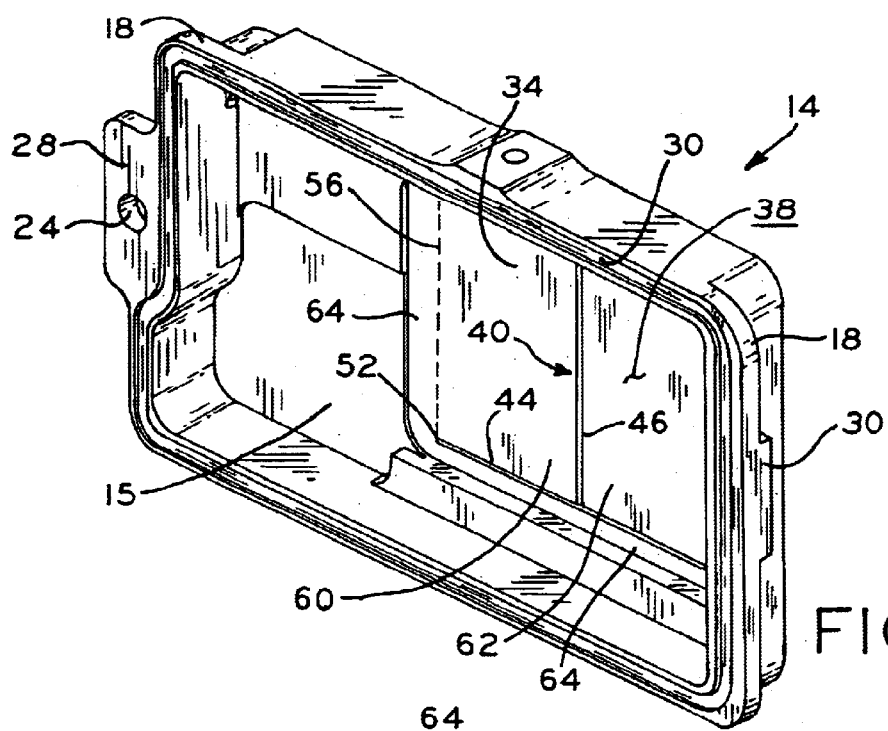
FIG. 2 is an interior perspective view of the cover of the container of FIG. 1.

Referring FIG. 1, there is shown one embodiment of a closed container according to the present invention. Container 10 is generally shaped as a rectangular parallelpiped having six primary enclosing walls, and is highly rigid, thereby protecting its contents, which may be, for example, a plurality of Li—$SO_2$ batteries 11, one of which is shown in ghosted lines in FIG. 1. Container may have, for example, a length L of approximately 5.2 inches, a width W of approximately 2.9 inches, and a depth D of approximately 4 inches. Container 10 comprises case 12, which forms five of the six primary enclosing walls, and removable cover 14 which is separably attached thereto. Cover 14 includes wall 15 of the container. Case 12 and cover 14 are provided with mating flanges 16, 18, respectively, which abut when the cover is in place. Apertures 22 and 24 are respectively provided in tab portions 26 and 28 of flanges 16 and 18. A locking mechanism (not shown) of any suitable type extends through apertures 22 and 24 for locking tabs 26 and 28 together. Referring to FIG. 2, flange 18 of cover 14 is provided with boss 30 at an end opposite tab 28. A portion (not shown) of case flange 16 overlies boss 30, thereby preventing separation of cover 16 from case 14 once the locking mechanism is engaged. The surface of flange 18 which abuts flange 16 is provided with a groove about its periphery in which flexible gasket 32 is disposed; gasket 32 being compressed when the locking mechanism is engaged, thereby sealing the interface of flanges 16 and 18. Thus, cover 16 is sealably attached to case 14, whereby the interior of closed container 10 is sealed from the exterior thereof.

Figure 3:
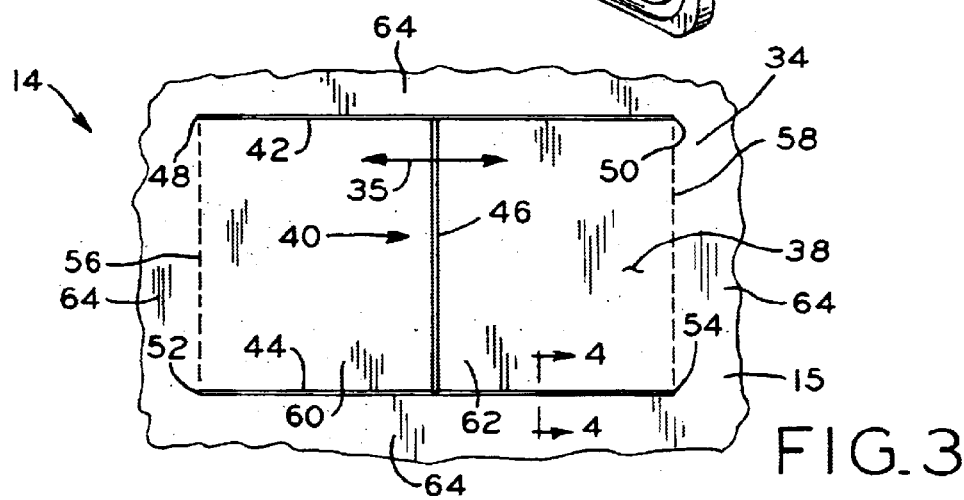
FIG. 3 is a slightly enlarged, fragmentary view of an embodiment of a groove provided on the interior surface of the cover of FIG. 2.
Figure 4:
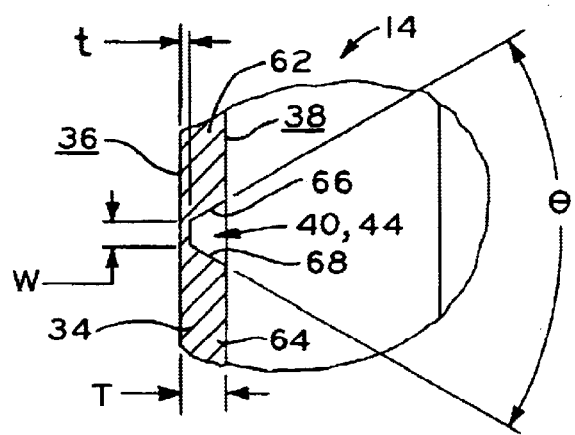
FIG. 4 is a greatly enlarged cross sectional view of the cover of FIG. 2, along line 4—4 of FIG. 3.

Cover 14 is machined, stamped or otherwise formed from a material such as, for example, A16061-T6 aluminum, as case 12 may be. It is envisioned that cover 14 may alternatively be formed of a suitable, injection molded polymer. Cover 14 is comprised of substantially planar panel 34 having exterior surface 36 and opposite interior surface 38 (FIGS. 2–4). Panel 34 partially forms wall 15. The rupturable venting means of container 10, is provided in panel 34, although those skilled in the art will appreciate that the venting means of the present invention may comprise any accommodating wall of the container. An advantage of providing the venting means in separable cover 14, however, is that after rupture of the container, it may be easily returned to its original, unruptured state by removal and replacement of the cover; the casing may be reused.

Groove 40 is provided in interior panel surface 38 as best shown in FIG. 2. Groove 40 is continuous, formed by removal of material from panel 34, and is comprised of three connected groove segments which, in the depicted embodiment, are substantially linear and approximately 2.3 inches in length. First and second groove segments 42 and 44 are parallel and spaced apart in panel 34. The material of panel 34 may have a grain structure which extends in the directions of arrow 35 (FIG. 3); to help facilitate rupture of the container, and groove segments 42 and 44 lie parallel to the directions of the grain structure to help facilitate even tearing of the material of panel 34 along groove segments 42 and 44. If cover 14 were to be an injection molded part, groove 40 would be formed by the exclusion of material from panel 34 therealong during molding, and the polymeric strands would lie in a substantially common direction, forming a grain structure in panel 34, and groove segments 42 and 44 would again be oriented in parallel to these strands. It is to be understood that groove segments 42 and 44 need not be precisely linear; alternatively, they may be somewhat curved. In either case, however, groove segments 42 and 44 extend smoothly along their respective lengths without zigzagging. Extending between groove segments 42 and 44 is third groove segment 46 which, in the depicted embodiment, is linear and extends substantially perpendicular to groove segments 42 and 44 and is interconnected to each of them at their approximate midpoints, as best shown in FIG. 3. The length of groove segment 46 may be approximately 1.75 inches. Third groove segment may be linear, as shown, or may alternatively be curved or include a sharp turn or zigzagging along its length.

First groove segment 42 has terminal ends 48 and 50 which are respectively substantially aligned in a direction parallel to that in which third groove segment 46 extends, with terminal ends 52 and 54 of second groove segment 44. This alignment is shown by dashed lines 56 and 58 in FIG. 3. In the depicted embodiment, groove 40 is generally shaped like the cross section of an I-beam, groove segment 46 corresponding to the web of the beam, groove segments 42 and 44 corresponding to the flanges of the beam at opposite ends of the web. It is envisioned that groove 40 may alternatively be provided in exterior panel surface 36 and achieve substantially similar performance of the inventive venting means.

Groove 40 divides panel 34 into first panel portion 60, located between first and second groove segments 42 and 44 on one side (the left side as viewed in FIG. 3) of third groove segment 46, within dashed line 56, second panel portion 62, located between first and second groove segments 42 and 44 on the other side of third groove portion 46, within dashed line 58, and third panel portion 64, which lies outside groove segments 42 and 44 and dashed lines 56 and 58. In its unruptured state of container 10, panel portions 60, 62 and 64 are coplanar, and panel portions 60, 62 and 64 are integrally connected across groove segments 42, 44 and 46. In this state, cover 14 is solid and impermeable, and a pressure differential may be maintained thereacross between the interior and exterior of container 10.

Referring to FIG. 4, it can be seen that groove segment 44, which is identical in cross sectional configuration to groove segments 42 and 46, has opposed side walls 66 and 68 which are disposed at inclusive angle θ, which may be approximately 60°. The width w of the "bottom" of groove 40 having a maximum value of approximately 0.020 inch. The thickness t of panel between exterior surface 36 and the bottom of the groove is 0.009 inch ±0.002, whereas panel 34 according to the depicted embodiment has a substantially uniform overall thickness T of 0.032 inch ±0.005. These dimensions, in conjunction with the relative size of cover 14, provide a suitably rigid exterior which prevents the batteries within the container from being crushed, punctured or damaged otherwise from external influences. In push tests in which a load was concentrated at a point on the exterior of cover 14 near the center of groove segment 46, a deflection of only about 0.125 inch was achieved at a maximum load of 148.1 lb. In impact tests in which a 1 lb. mass having a spherical tip was dropped through a tube onto the exterior of cover 14 near the center of groove segment 46, it was found that the inventive panel could withstand a concentrated application 1.5 ft-lb of energy and remain in an unruptured state. These results demonstrate the high rigidity of panel 34. Further, if the material of panel 34 is metal, it is expected that thickness T may have a minimum value of 0.011 inch and still be substantially more rigid than the previous rupture panels described hereinabove.

Further, it has been determined in simulated explosion tests utilizing pressurized air as the fluid medium, that subjecting the interior of a container comprising cover 14 as described herein above, initially having no substantial pressure differential between is exterior 36 and interior 38 surfaces, to instantaneous pressure increases of 200, 400 and 600 psi results in panel 34 reaching its fully ruptured state within about 10 milliseconds, the pressure required to rupture the panel in all cases being approximately 100 psig. These tests demonstrate that container 10 remains in an unruptured state at a first interior pressure of up to about 100 psig, and has a ruptured state at a second interior pressure above about 100 psig.

Referring now to FIGS. 5–8, there is shown a series of successive states of rupture. FIG. 5 illustrates container 10 very shortly after initial rupture, which occurs when the interior pressure of the container suddenly exceeds its first interior pressure, which in the instant case is about 100 psig. As the pressure within container 10 rises from the first pressure to the second pressure, at which rupture occurs, panel 34 initially splits across third groove segment 46, thereby breaking the integral connection of panel portions 60 and 62 across that groove segment, thereby forming free edges 46a and 46b comprising the opposed walls (similar to walls 66 and 68 of FIG. 4) which partially defined groove segment 46, on panel portions 60 and 62. Once separation of panel portions 60 and 62 has occurred across groove segment 46, panel 34 begins to tear in opposite directions, away from free edges 46a and 46b, along groove segments 42 and 44, thereby creating free edge 42a on one side of panel portion 60, and free edge 44a on the opposite side of panel portion 60. Simultaneously, edges 42b and 44b are formed on opposite sides of panel portion 62. Edges 42c and 44c are formed on panel portion 64 as panel 34 is ripped along grooves 42 and 44.

As shown in FIGS. 5–8, panel portions 60 and 62 approximate double doors which open from the center (groove segment 46), and are hinged along lines 56 and 58 (FIG. 3). Panel 34 is plastically deformed along lines 56 and 58, and in the ruptured state the "doors" remain open. The doors also remain attached to cover 14 along lines 56 and 58, thereby preventing fragmentation of the cover during venting. No loose fragments of container 10 are thus created which may strike those near the venting container.

Referring now to FIGS. 9 and 10, there is shown an alternative embodiment of a separably attached cover for a second embodiment of a closed container according the to present invention. Common elements between cover 14 and cover 114 are identically referenced; similar, elements corresponding to those of the first embodiment are referenced by adding the value 100 to the above-identified reference numerals (e.g., cover 14 has groove 40; cover 114 has groove 140). Elements unique to the second embodiment are uniquely referenced. Cover 114 is removably attached to case 12 to sealably close container 110 (not shown). Wall 115 of cover 114 is provided with large rectangular aperture 80 which provides a vent outlet from the container. Covering aperture 80, and removably mounted to the interior of cover 114 is replaceable panel (or patch) 134 having exterior surface 136 and interior surface 138. Panel or patch 134 partially forms wall 115. Interior surface 138 of patch 134 is provided with groove 140 comprising linear groove segments 142, 144 and 146 which interconnect in the same manner as corresponding groove segments 42, 44 and 46 do. Linear groove segments 142 and 144 extend in directions parallel to the grain of patch 134. The outer periphery of patch 134 overlies the portion of cover 114 about the periphery of aperture 80, thereby forming abutting contact therebetween. A suitable adhesive may be used to attach the interfacing surfaces of patch 134 and cover 114. Alternatively, attachment of patch 134 to cover 114 may employ fasteners (not shown). Panel portions 160 and 162 are disposed within the boundary of aperture 80, and upon rupture of container 110, swing outward in the above-described manner through aperture 80. Portions 160 and 162 are retained to patch 134 along lines 156 and 158, respectively, along which patch 134 is plastically deformed. The embodiment shown in FIGS. 9 and 10 provides the advantage of allowing cover 114 to be reused after the container has ruptured by merely replacing patch 134. The above-mentioned dimensions and materials associated with panel 34 apply to patch 134, and it is anticipated that its performance vis-a-vis panel 134 will be comparable.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A recloseable container for batteries, having walls defining an interior which, when said container is closed, is subjected to at least one of a first and a second pressure, said first pressure much lower than said second pressure, said container comprising:

a highly rigid panel at least partially forming one of the container walls and being formed of a single material layer, said panel having an interior surface exposed to said interior of said container, and an opposite, exterior surface, one of said interior and exterior panel surfaces provided with a groove having first and second elongate groove segments which extend smoothly along their respective lengths, said first and second groove segments laterally spaced, and a third elongate groove segment extending between and connected to said first and second groove segments, said panel having a first portion which lies on one side of said third groove segment, and a second portion which lies on the opposite side of said third groove segment, said first and second panel portions located between said first and second groove segments and integrally connected across said third groove segment, whereby said first and second panel portions become disconnected across said third groove segment in response to said container interior being at said second container interior pressure, whereby said panel is in a ruptured state.

2. The container of claim 1, including at least one battery cell disposed in said container.

3. The container of claim 1, wherein said first and second groove segments are substantially linear.

4. The container of claim 3, wherein said first and second groove segments are substantially parallel.

5. The container of claim 1, wherein said third groove segment is substantially linear.

6. The container of claim 5, wherein said first and second groove segments are substantially linear and said third groove segment is substantially perpendicular to said first and second groove segments.

7. The container of claim 1, wherein said panel is metal and has a thickness of at least 0.011 inch.

8. The container of claim 1, further comprising a separable cover and a case, said cover attached to said case, and wherein said cover includes said panel.

9. The container of claim 8, wherein said cover is aluminum.

10. The container of claim 1, wherein one of said walls of said container is provided with a vent outlet, said panel mounted over said vent outlet.

11. The container of claim 10, wherein said panel is replaceably mounted over said vent outlet.

12. The container of claim 11, wherein said panel has an outer periphery which overlies a portion of the wall surrounding said vent outlet.

13. The container of claim 12, wherein said panel is in abutting contact with said portion of said wall surrounding said vent outlet.

14. The container of claim 13, wherein said panel outer periphery is sealed to said portion of said wall surrounding said vent outlet.

15. The container of claim 12, wherein said panel is adjacent to an interior surface of said portion of said wall surrounding said vent outlet.

16. The container of claim 1, wherein said groove is substantially H-shaped.

17. The container of claim 1, wherein each said groove segment has a substantially consistent depth along its entire length.

18. The container of claim 1, wherein each said groove segment has opposed sidewalls having an inclusive angle of about 60° therebetween.

19. The container of claim 1, wherein said panel has a directional grain, said first and second linear groove segments extending in directions substantially parallel with said grain.

20. The container of claim 1, wherein, in its said ruptured state, said container is unfragmented.

21. The container of claim 1, wherein, in said ruptured state, said panel is plastically deformed along first and second lines which extend between the terminal ends of said first and second groove segments, each of said lines extending substantially in a direction along which said third groove segment extends, said first and second panel portions respectively attached to said panel along said first and second lines.

22. A recloseable container having walls defining an interior which, when said container is closed, is subjected to at least one of a first and a second pressure, said first pressure much lower than said second pressure, said container comprising:

a highly rigid integral panel at least partially forming one of the container walls, said panel having an interior surface exposed to said interior of said container, and an opposite, exterior surface, said panel having an unruptured state at said first pressure, said panel urged into a ruptured state in response to an increase in interior pressure from said first pressure to said second pressure; and means for forming a pair of outwardly swinging doors in said panel as said panel is urged into its said ruptured state, said doors being open and attached to said panel in said ruptured state.

23. A recloseable container having walls defining an interior which, when said container is closed, is subjected to at least one of a first and a second pressure, said first pressure much lower than said second pressure, said container comprising:

a highly rigid panel at least partially forming one of the container walls and being formed of a single material layer, said panel having an interior surface exposed to said interior of said container, and an opposite, exterior surface, one of said interior and exterior panel surfaces provided with a groove having first and second elongate groove segments which extend smoothly along their respective lengths, said first and second groove segments laterally spaced, and a third elongate groove segment extending between and connected to said first and second groove segments, said panel having a first portion which lies on one side of said third groove segment, and a second portion which lies on the opposite side of said third groove segment, said first and second panel portions located between said first and second groove segments and integrally connected across said third groove segment, whereby said first and second panel portions become disconnected across said third groove segment in response to said container interior being at said second container interior pressure, whereby said panel is in a ruptured state.

24. The container of claim 23, wherein said first, second and third groove segments are substantially linear.

25. The container of claim 24, wherein said third groove segment is substantially perpendicular to said first and second groove segments, whereby said groove is substantially H-shaped.

26. The container of claim 23, further comprising a separable cover and a case, said cover attached to said case, and wherein said cover includes said panel.

27. The container of claim 23, wherein one of said walls of said container is provided with a vent outlet, said panel mounted over said vent outlet.

28. The container of claim 23, wherein said panel has a grain, said first and second linear groove segments extending in directions parallel with said grain.

29. The container of claim 23, wherein, in its said ruptured state, said container is unfragmented.

* * * * *